(12) United States Patent
Newbill

(10) Patent No.: US 6,673,728 B1
(45) Date of Patent: Jan. 6, 2004

(54) LOW PERMEABILITY, HIGH STRENGTH TIMING FABRIC FOR UTILIZATION WITHIN AIRBAG INFLATION MODULES

(75) Inventor: Thomas Wayne Newbill, LaGrange, GA (US)

(73) Assignee: Milliken & Company, Spartanbrg, SC (US)

( * ) Notice: Subject to any disclaimer, the term of this patent is extended or adjusted under 35 U.S.C. 154(b) by 329 days.

(21) Appl. No.: 09/616,166

(22) Filed: Jul. 14, 2000

(51) Int. Cl.[7] ................................................. B32B 5/08
(52) U.S. Cl. .................... 442/218; 280/728.1; 280/727; 280/728.2; 280/732; 280/733; 280/736; 442/203; 442/208; 442/209; 442/210; 442/211; 442/220; 139/384 R; 139/387 R; 139/389; 139/390
(58) Field of Search .............................. 442/60, 76, 79, 442/85, 86, 203, 208, 209, 210, 211, 212, 213, 214, 215, 216, 217, 218, 219, 220; 280/728.1, 727, 728.2, 732, 733, 736; 149/3; 139/35, 116.1, 320, 384 R, 387 R, 389, 390

(56) References Cited

U.S. PATENT DOCUMENTS 5,441,798 A    8/1995    Nishimura et al. ......... 428/229

FOREIGN PATENT DOCUMENTS

| EP | 0/995645 | 9/1999 |
|---|---|---|
| GB | 2/343151 | 5/2000 |
| WO | WO 00/32447 | 6/2000 |
| WO | WO 01/22056 | 7/2001 |

*Primary Examiner*—Arti R. Singh
(74) *Attorney, Agent, or Firm*—Terry T. Moyer; William S. Parks

(57) ABSTRACT

Specific fabric articles exhibiting very low air and/or gas permeability (even upon application of high inflation pressures) and very high tear strengths are herein disclosed and claimed. Such a specific fabric also permits the incorporation of discrete openings (through cutting, for example) through which air and/or gas introduced by an airbag inflation canister will travel. Such a specific fabric acts as a barrier to the complete introduction of high pressure inflation gases into an airbag cushion, thereby permitting a more controlled, safer inflation upon the occurrence of a collision event. Thus, the specific inventive fabric permits movement of inflation gas and/or air substantially solely through the openings within the fabric and not through the interstices between the individual fiber constituents. The inventive fabric also withstands the intense heat generated by the explosion which creates the inflation gases and does not lose any appreciable degree of performance during and after such an inflation event. An inflation module, as well as an entire vehicle restraint system, comprising such a specific timing fabric is also contemplated within this invention.

4 Claims, 3 Drawing Sheets

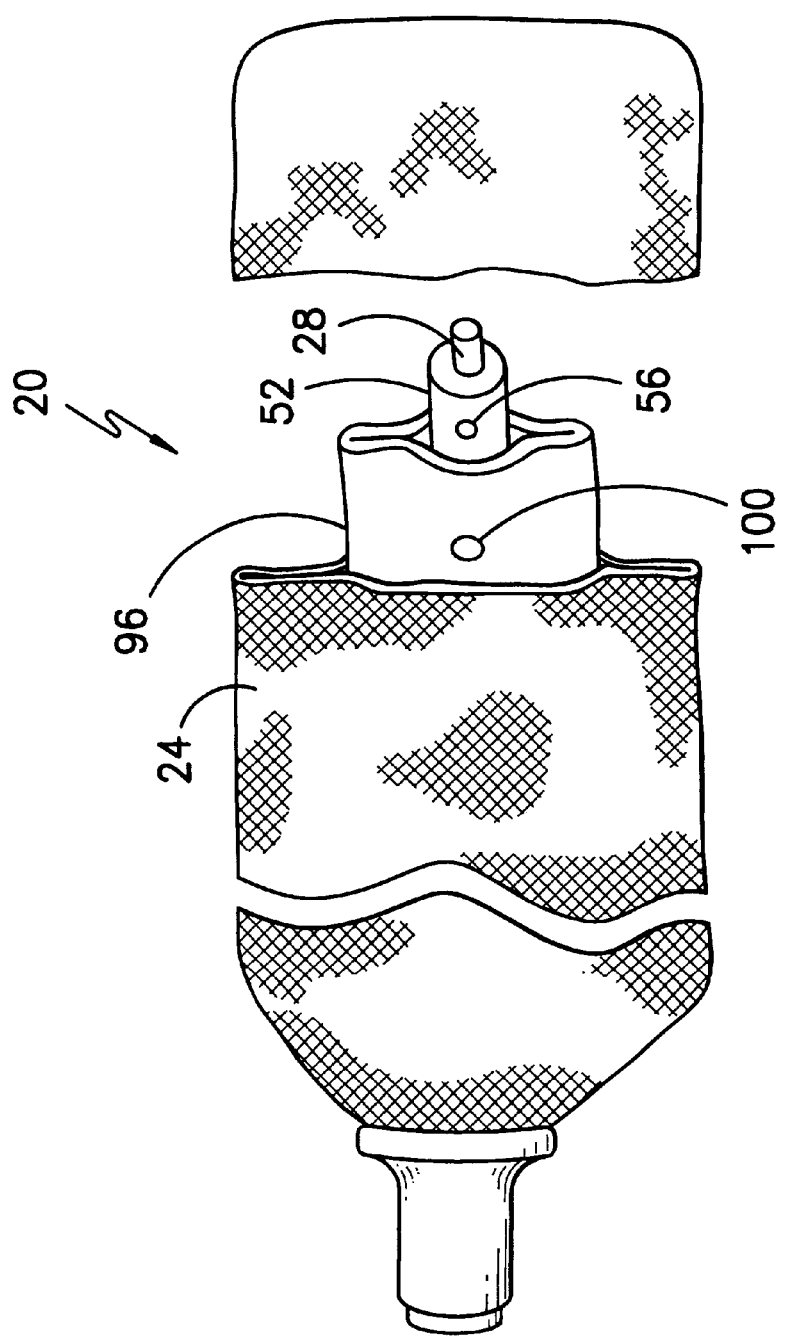
FIG. -1-

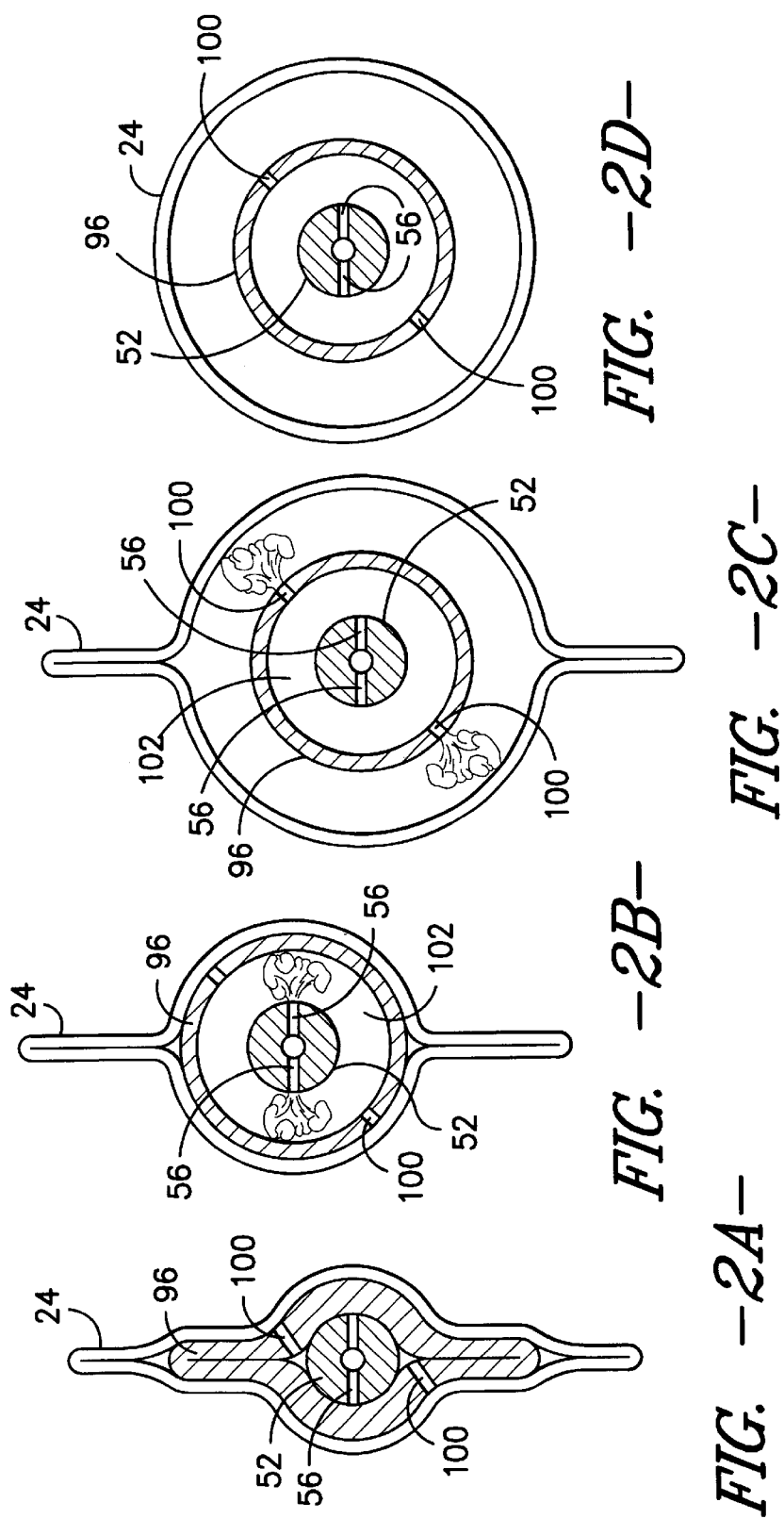

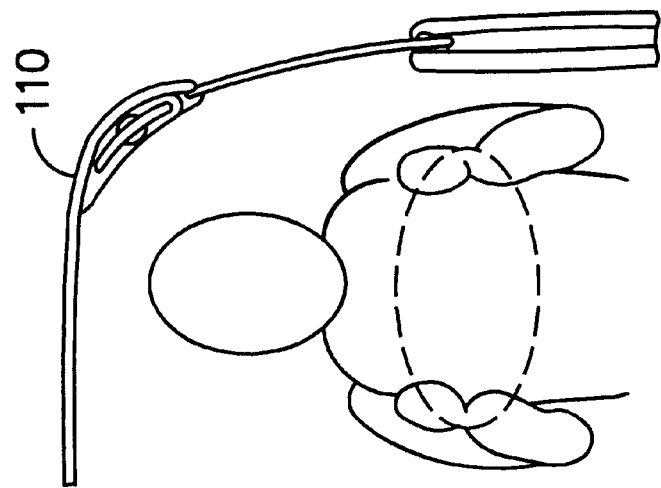
FIG. -4-
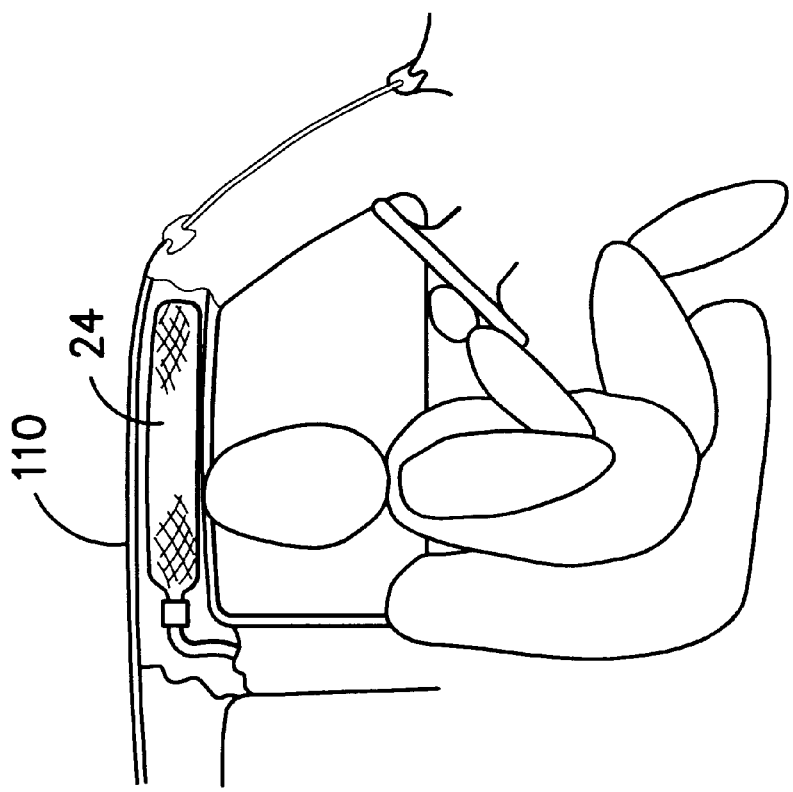
FIG. -3-

LOW PERMEABILITY, HIGH STRENGTH TIMING FABRIC FOR UTILIZATION WITHIN AIRBAG INFLATION MODULES

FIELD OF THE INVENTION

This invention relates generally to specific fabric articles exhibiting very low air and/or gas permeability (even upon application of high inflation pressures) and very high tear strengths. Such a specific fabric also permits the incorporation of discrete openings (through cutting, for example) through which air and/or gas introduced by an airbag inflation canister will travel. Such a specific fabric acts as a barrier to the complete introduction of high pressure inflation gases into an airbag cushion, thereby permitting a more controlled, safer inflation upon the occurrence of a collision event. Thus, the specific inventive fabric permits movement of inflation gas and/or air substantially solely through the incorporated openings within the fabric and not through the interstices between the individual fiber constituents. The inventive fabric also withstands the intense heat generated by the explosion that creates the inflation gases and does not lose any appreciable degree of performance during and after such an inflation event. An inflation module, as well as an entire vehicle restraint system, comprising such a specific timing fabric are also contemplated within this invention.

BACKGROUND OF THE PRIOR ART

All U.S. patents cited herein are hereby fully incorporated by reference.

Inflatable protective cushions used in passenger vehicles are a component of relatively complex passive restraint systems. The main elements of these systems are: an impact sensing system, an ignition system, a propellant material, an attachment device, a system enclosure, and an inflatable protective cushion. Upon sensing an impact, the propellant is ignited causing an explosive release of gases filing the cushion to a deployed state which can absorb the impact of the forward movement of a body and dissipate its energy by means of rapid venting of the gas. The entire sequence of events occurs within about 30 milliseconds. In the undeployed state, the cushion is stored in or near the steering column, the dashboard, in a door, in the roof line or roof rail, or in the back of a front seat placing the cushion in close proximity to the person or object it is to protect.

Inflatable cushion systems commonly referred to as air bag systems have been used in the past to protect both the operator of the vehicle and passengers. Systems for the protection of the vehicle operator have typically been mounted in the steering column of the vehicle and have utilized cushion constructions directly deployable towards the driver. These driver-side cushions are typically of a relatively simple configuration in that they function over a fairly small well-defined area between the driver and the steering column. One such configuration is disclosed in U.S. Pat. No. 5,533,755 to Nelsen et al., issued Jul. 9, 1996, the teachings of which are incorporated herein by reference.

Inflatable cushions for use in the protection of passengers against frontal or side impacts must generally have a more complex configuration since the position of a vehicle passenger may not be well defined and greater distance may exist between the passenger and the surface of the vehicle against which that passenger might be thrown in the event of a collision. Prior cushions for use in such environments are disclosed in U.S. Pat. No. 5,520,416 to Bishop; U.S. Pat. No. 5,454,594 to Krickl; U.S. Pat. No. 5,423,273 to Hawthorn et al.; U.S. Pat. No. 5,316,337 to Yamaji et al.; U.S. Pat. No. 5,310,216 to Wehner et al.; U.S. Pat. No. 5,090,729 to Watanabe; U.S. Pat. No. 5,087,071 to Wallner et al.; U.S. Pat. No. 4,944,529 to Backhaus; and U.S. Pat. No. 3,792,873 to Buchner et al.

The majority of commercially used restraint cushions are formed of woven fabric materials utilizing multifilament synthetic yarns of materials such as polyester, nylon 6 or nylon 6,6 polymers. Representative fabrics for such use are disclosed in U.S. Pat. No. 4,921,735 to Bloch; U.S. Pat. No. 5,093,163 to Krummheuer et al.; U.S. Pat. No. 5,110,666 to Menzel et al.; U.S. Pat. No. 5,236,775 to Swoboda et al.; U.S. Pat. No. 5,277,230 to Sollars, Jr.; U.S. Pat. No. 5,356,680 to Krummheuer et al.; U.S. Pat. No. 5,477,890 to Krummheuer et al.; U.S. Pat. No. 5,508,073 to Krummheuer et al.; U.S. Pat. No. 5,503,197 to Bower et al.; and U.S. Pat. No. 5,704,402 to Bowen et al. A two-weave construction airbag cushion is exemplified in U.S. Pat. No. 5,651,395 to Graham et al. but does not discuss the importance of narrow basket-weave single fabric layers.

As will be appreciated, the permeability of an airbag cushion structure is an important factor in determining the rate of inflation and subsequent rapid deflation following the impact event. Different airbag cushions are utilized for different purposes. For instance, some airbag cushions are installed within inflation modules for driver protection within the steering column of an automobile. Others are utilized as protection for front seat passengers and are installed in and around the glove compartment and/or on the dashboard in front of such a passenger seat. Still others have been developed in an effort to protect all passengers during a long-duration impact event, such as, for example, a rollover collision. In those types of crashes, the target airbag cushion must inflate quickly under high pressure (such as between about 10 and 40 psi) and remain inflated at a relatively high pressures in order to provide the greatest degree of protection to such passengers. Furthermore, such long-duration airbag cushions preferably comprise "pillow" formations created through the attachment of at least two different fabrics or fabric ends together and sealed, sewn, or the like, together. Upon inflation the free space between the attachment points inflate as well, thereby producing the desired cushioned "pillow" structures. Such long-duration, "pillowed" structures have been disclosed in the prior art as airbag cushions within U.S. Pat. No. 5,788,270 to Halano as well as within U.S. patent application Ser. No. 09/406,264 to Sollars, Jr., now U.S. Pat. No. 6,220,309.

Generally, recent airbag improvements have involved various types of alterations to either the bag structures and/or coatings, or, most importantly for this invention, the inflators and propellants utilized to provide more effective and safer supplemental vehicle restraint systems. In the past, the standard inflators produced extremely hot and potentially destructive explosions during propellant ignition to effectively and quickly (e.g., in less than 0.2 milliseconds) introduce sufficient amounts of inflation gas into the desired airbag to protect a passenger or driver during a collision. In recent years, more controlled and safer inflation modules have been developed which still provide highly effective inflations as needed. However, some drawbacks have resulted, particularly within and for larger airbag which require long-term, sustained inflation (such as side curtain-type airbags). Most notably, such airbags must be inflated at an even rate to provide the most efficient and effective protection to the vehicle occupants. The "pillowed" structures within the target side curtain airbags thus need a relatively similar inflation pattern. Since most inflators for such airbags have been developed to inflate from a single small area and force inflation gas to portions of the target airbags at differing distances from the point of ignition, controlled inflation at similar speeds have been extremely difficult. New developments, such as that disclosed within European Patent Application 0,995,645 A2 to OEA, Inc. have provided highly desirable procedures and apparati to inflate such side curtain airbags in more efficient and effective manners. In this specific Application, the ignited propellant is forced into an inflation manifold (for example, a rubber tube) located in the roofline of the vehicle. This manifold comprises openings at selected locations which permit passage of certain limited amounts of inflation gas to eventually enter and inflate the target airbag, particularly within the specific "pillowed" structures, on an even basis. However, even with this system in place, there still exists a need to control the limited amounts of inflation gas in order to assure a controlled and effective airbag inflation. Thus, there is also taught the addition and use of a timing member, such as a plastic or metal, which itself comprises openings corresponding to those present within the inflation manifold. This metal or plastic timing member is preferably present in a tube shape as well and will inflate to a very low degree, if at all, upon entry of the inflation gas from the inflation manifold. However, inflation gas will also be forced through the openings within the timing member and then into the airbag for inflation. Although the actual time of inflation is incredibly fast (again, no more than about 0.2 milliseconds), the ability to provide controlled and even inflation, as well as to better ensure the airbag does not overinflate or inflate too quickly is paramount to providing a safe and effective supplemental vehicle restraint system of this type. Without such a timing member, the controlled inflation would be extremely difficult if not impossible due to the incredible, yet necessary, force produced upon ignition of the propellants in order to actually provide the quick inflation of the target airbag.

Furthermore, with regard to this OEA, Inc. European Patent Application, high temperature inflation gases are generated during the propellant ignition, both as a result of such an explosion and in order to assure full inflation of the target airbag. If the inflation is too cool in temperature, the gases will not expand sufficiently and thus the target airbag will not fully inflate. Thus, it is, as noted above, extremely important to permit sufficient, though not too much, inflation gases to pass through the openings within the metal or plastic timing member. The passage of too much inflation gas (through, for example, weak or damaged areas within the timing member) would actually cool the inflation gas and prevent the desired degree of airbag inflation. However, there is also a problem with such excessive generated heat in that the target airbag may conduct such heat to the vehicle occupant. Such problems may be alleviated by the application of exterior and/or interior coatings to the target airbag; however, the presence and utilization of the metal or plastic timing member aids in this instance as well.

Although such a timing member has been taught in the past as a desired component within such new airbag inflation systems, there have no teachings concerning fabrics utilized as timing members with any such high pressure inflation assemblies. Fabrics are most highly desired for such a purpose due to costs, ease of manufacture, foldability, unfoldability (upon inflation), lower weight, and many other reasons. Such a practice of fabric timing members has been limited, if not impossible, due to the difficulties in developing a proper fabric for this specific purpose. Again, the fabric must be able to withstand extremely high pressures and tensile forces during inflation, excessive heat during inflation, and must effectively permit the vast majority of inflation gas to escape through the provided openings which correspond to the inflation manifold openings, and thus must exhibit extremely low air and gas permeabilities in the remaining portions of its constituent fabric. Furthermore, since such a timing member will be folded during storage for an indefinite amount of time prior to use, it must also exhibit extremely good blocking characteristics such that the fabric portions do not adhere together in a deleterious manner such that upon inflation the timing member does not unfold properly and thus does not function as needed. There have been no teachings or developments of such fabric timing member meetings all of these objectives to date within the pertinent prior art. Thus, there is a perceived need to provide such an effective fabric timing member in order to make available to the airbag industry these new, safe, and highly effective inflation modules.

In light of the background above, it can be readily seen that there exists a need for an effective fabric timing member for utilization within such specific airbag inflation assemblies having inflation manifolds for the transport of inflation gas from the propellant ignition location ultimately into the target airbag article. The reasons for utilizing a fabric for such a timing member include, without limitation, the ability to expand and unfold (and thus the ability to fold and pack well within the inflation assembly itself) upon inflation, the low costs involved with producing fabrics as opposed to other inflation articles (including metal articles), lighter weight inflation assemblies, reduction of complex parts within the inflation assembly, simplification of inflator design and function, and adaptability of such an inflation assembly to multiple inflation applications. Furthermore, in furtherance of these objectives, such a fabric permits the ability to provide strength to specific areas of the timing member through weave formations or insertions of extra threads, and the ability to control (preferably lower and eliminate, if possible) the air permeability of the timing member through the application of coating compositions to the surfaces thereof. Thus, although alternative articles and structures may provide some of the characteristics necessary for proper functioning within an inflation assembly as described above, in short, the utilization of fabrics for this purpose is most highly desired.

Such fabric utilization within an inflation assembly timing member has been rather difficult to achieve until now, unfortunately. It is true that fabrics have been utilized as the primary constituents within airbags themselves (which must withstand heat and high inflation pressures); however, such fabrics have not proven useful and/or workable as timing members. Traditional airbag fabrics are structured to either permit quick inflation and then quick deflation (such as within driver and front-seat passenger side airbags, and also certain non-rollover protection side curtains) or long-term inflation (to protect in rollover situations, such as the side curtain-type airbags discussed above). As such, the fabrics utilized are not conducive to actually acting in a controlling fashion for extremely high pressure and high temperature inflation gases. The tensile strengths exhibited by these traditional airbag fabrics do not exceed 400 pounds per square inch (or about 675 newtons per centimeter). The timing member must exhibit a far greater tensile strength on the order of at least about 900 lb/inch in the warp direction (preferably between about 950 and 1,500 lb/inch, more preferably between about 1,000 and 1,250 lb/inch, and most preferably from about 1,000 to about 1,100 lb/inch) and at least 700 lb/inch in the fill direction (preferably between about 750 and 1,200 lb/inch, more preferably between about 800 and 1,000 lb/inch, and most preferably between about 800 and 900 lb/inch). Furthermore, the high temperatures withstood by the traditional airbag fabrics are generally much lower than those required of such a timing member (due to the location of the entire timing member in relation to the actual point of propellant ignition as compared with an airbag cushion). Thus, it is evident that although airbag fabrics have been developed in the past to withstand certain high inflation pressures and temperatures, such fabrics do not function properly as timing members within the new inflation assemblies (as discussed above) due to the pressures and temperatures which exceed such limits.

Other fabrics have been developed as filter fabrics for airbags, such as in U.S. Pat. No. 5,441,798 to Nishimura et al., which permit control of inflation to prevent too rapid and excessive airbag expansion upon ignition of a propellant. However, such filter cloths and fabrics do not include specific openings through which substantially all of the inflation gasses are transported into the target airbag. In fact, the fabrics discussed and disclosed by patentee actually exhibit relatively high air and/or gas permeabilities as opposed to the required low permeabilities exhibited by the inventive timing member. Due to such high permeability characteristics, the tensile strength of the patented filter cloth within Nishimura et al. is apparently relatively low (on the magnitude of standard airbag fabrics themselves) which thus, again, would prevent utilization of such a patented filter cloth as a timing member within the inflation assemblies discussed above.

OBJECTS AND DESCRIPTION OF THE INVENTION

As such, it is an object of this invention to provide a fabric for proper functioning as a timing member for a high pressure inflation assembly comprising an extended inflation gas manifold. A further objective is to provide a relatively inexpensive high tensile strength, low air and/or gas permeability timing fabric for controlled inflation of an airbag cushion.

Accordingly, this invention is directed to an airbag inflation assembly timing member comprising discrete openings in relation to preselected locations for introduction of inflation gas within a target airbag;

wherein said timing member comprises a fabric;

wherein a coating has been applied to at least a portion of said fabric; and wherein said timing member exhibits (a) an average overall tensile strength of at least 900 lb/inch in the warp direction and an average overall tensile strength of at 700 lb/inch, both up to a temperature of at least 80° C., (b) a permeability to air of at most 0.07 cfm at 125 Pa and of at most 0.3 cfm at 2,500 Pa, and (c) no appreciable blocking upon inflation upon storage in an environment heated to about 100° C. for 7 days.

As noted above, the term timing member is intended to encompass an article of manufacture which acts to control the movement, in both direction and amount, of inflation gasses from an inflator (generally comprising a propellant and a means to ignite said propellant upon sensing a collision of sufficient impact to require the need for a supplemental vehicle restraint system for then vehicle occupants). This article is described more fully within the drawings as described below. Such an inventive timing member permits movement of inflation gasses substantially solely through the preselected location openings in order to ensure the inflation gasses are directed into desired and discrete locations within the target airbag. This fabric article thus must exhibit the aforementioned tensile strength and low permeability characteristics in order to ensure the inflation gases are in fact forced solely through the preselected openings and do not leak through the interstitial spaces between constituent fibers. Additionally, the tensile strength requirements best ensure that the timing member will not exhibit tears as a result of forcing an excessive amount of inflation gas through the small preselected openings. As one of ordinary skill in the art will appreciate, the pressure applied to such an opening would most likely create a larger opening depending on the weakness of the fabric present in the areas surrounding the openings themselves. In this situation, the timing member fabric is of sufficient tensile strength to prevent such deleterious tearing, thereby providing an effective means to control the amount and direction of inflation gas into the target airbag. The fabric of the timing member may be woven, laid scrim, or knit in structure. Preferably, such a fabric is woven in any number of weave formations, including plain weave, panama weave, dobby weave, and the like, and may be produced on any type of weaving loom including, without limitation, shuttle, rapier, air-jet, and water-jet looms. Preferably, the timing member fabric is of plain weave construction produced on a rapier loom (due to the utilization of high denier yarns). Furthermore, the picks by ends (per square inch of fabric) count of such a fabric ranges anywhere from about 40 by 40 to about 60 by 15. Preferably, such a count is from about 45 by 35 to about 55 by 20, more preferably from about 50 by 30 to about 54 by 20, and most preferably about 54 by 22.

Of critical importance to achieve this desired level of tensile strength and thus the ability to control inflation gas from the inflation assembly into the target airbag are the elongation characteristics exhibited by the overall timing member. In particular, it has been found that the utilization of a low-shrink, high elongation warp yarn and a low elongation fill yarn provides the necessary high tensile strength levels. In this manner, the warp yarns permit expansion of the timing member upon sudden inflation to compensate for the quick increase in pressure applied to the fabric article but the fibers do not all elongate, thereby limiting the expansion, and, in particular, preventing appreciable amounts of air from escaping between the very thick warp yarns and the low elongation fill yarns. The warp elongation absorbs the initial shock to the fabric due to the quick and high pressure inflation while the fill yarns permit retention of shape, location, and ultimately, direction of movement of the timing member in relation to the inflation itself. The fill yarns are thus of extremely high denier (at least 840, preferably in excess of 1000, and most preferably as high as about 1600) and may be single or multi-ply as well. The warp yarns preferably, though not necessarily, are comprised of a two-ply, high denier fiber, such as, without limitation polyester (polyethylene terephthalate), nylon, and the like, preferably polyester. The denier must be 840 or higher to fill the interstitial spaces for permeability reduction. Preferably, this warp yarn is a two-ply yarn of individual fibers of 840 denier (average) each or higher. Multi-ply yarns of greater than 2-ply may also be utilized as well as single ply yarns that exhibit proper elongation and bulkiness (i.e., sufficient denier to fill the interstitial spaces). Again, however, 2-ply 840 denier polyester yarns are most preferred due to cost, strength, and availability.

The low permeability level necessary for proper functioning by the timing member for its intended purpose is provided through the combination of the high denier yarns within the fabric structure as well as the presence of a seal coating over at least a portion of the fabric constituents within the timing member. As is well known throughout the airbag industry and art, coatings have been applied to airbag cushions and fabrics to provide low permeability characteristics to the coated airbag fabric portions. In this instance, the low permeability characteristics are provided in much the same manner as with standard airbags except that the pressures applied to the discrete areas surrounding the preselected openings within the timing member are subject to much greater stresses and forces than inflated airbags. Again, the presence of bulkier yarns (standard airbag fabrics comprise at most 840 denier yarns, which is still a rare occurrence; generally, 420 to 630 denier is used for such standard fabrics) provides a more effective barrier to gas escape through the interstitial portions between the fibers and also provides the need for coatings of relatively low thicknesses to be applied thereto. Such coatings may comprise standard silicones (polyorganosiloxanes, for example), polyurethanes, polyarnides, rubbers, such as neoprene, ethylene-propylene diene monomer rubber (EPDM), hydrogenated nitrile-butadiene rubber (NBR), butyl rubber, acrylic rubber, and the like, in add-on weights of between about 0.8 ounces per square yard and 6.0 ounces per square yard. The lower the coating add-on weight the better due to the costs of such materials. The coating is applied to the target fabric surface through any well known means such as knife coating, scrape coating, immersion coating, spray coating, pad coating, and the like. Preferably, such a coating is applied through a standard knife over gap procedure in order to apply a relatively uniform coating over the individual yarns as well as within the interstitial spaces between the yarns themselves. Other possible components present within the cross-linked elastomeric resin coating composition are thickeners, antioxidants, flame retardants, coalescent agents, adhesion promoters, and colorants.

The coating is utilized not just for the reduction of gas permeability but also to provide a manner of preventing heat conduction from the inflation assembly ultimately to the vehicle occupant. Thus, such coatings help absorb a great deal of heat in such an instance while the remaining, potentially harmful high temperatures are absorbed by the coatings and fabrics of the actual target airbag cushion. It is important to remember, and thus note, that the temperature of the inflation gas is not reduced by the coatings applied to the timing member fabric since a sufficiently high temperature is required to actually inflate the target airbag in the first place. The coating simply absorbs excess heat and acts as a buffer to conduction of such heat to the exterior of the target airbag upon inflation.

In addition, it is also important that the timing member withstand not only heat but also cold temperatures, particularly during long-term storage within an automobile. Again, the potential occurrence of a collision is impossible to determine; thus, the inflation assembly and its constituent parts must function properly at any time during the lifetime of the vehicle itself. Thus, with the potential for cold temperatures during such a lifetime, the fabric of the timing member must not be deleteriously affected by such diverse temperatures. The coating provides some reassurance in such a situation by protecting the fibers from the effects of cold temperatures.

The thinner the coating the better the blocking characteristics for the fabric. This property is of utmost importance to best ensure the folded timing member will not adhere together to such an extent that upon inflation the fabric portions do not permit the correct directional control of inflation gas. Thus, a thickness of relative uniformity of from about 1.0 to about 2.0 ounces per square yard of fabric, more preferably from about 1.2 to about 1.8 ounces per square yard, and most preferably from about 1.4 to about 1.6 ounces per square yard is desired. The timing member fabric must thus pass a blocking test which indicates the force required to separate two portions of coated fabric from one another after prolonged storage in contact with each other (such as an airbag is stored). Laboratory analysis for blocking entails pressing together coated sides of two 2 inch by 2 inch swatches of airbag fabric at 5 psi at 120° C. for 7 days. If the force required to pull the two swatches apart after this time is greater than 50 grams per square yard, or the time required to separate the fabrics utilizing a 50 gram weight suspended from the bottom fabric layer is greater than 10 seconds, the coating fails the blocking test. Clearly, the lower the required separating shear force, the more favorable the coating.

Of particular importance and of unexpected benefit is the ability to coat the timing member fabric components without first cleaning or scouring such to remove certain finishing agents, yarn lubricants, and the like. The timing member should comprise yarns which are twisted and plied to a degree wherein size is generally unnecessary (although, in other embodiments, size may be applied prior to weaving, knitting, etc.) to permit reliable construction (through weaving, knitting, etc.). Generally, in order to apply reliable air permeability reducing amounts of coating materials (in this invention, a coating of sufficient construction and thickness to reduce the permeability to at most 0.3 cfm), the fabric must first be cleaned and/or scoured to remove the potentially deleterious adhesion-reducing size and/or lubricants. In this invention, it has now been realized that the bulkiness of the constituent yarns and fibers, and the lack of size for proper fabric construction, permits effective adhesion with or without the presence of such lubricant materials and/or finishing agents thereon. As such, it is believed that the inventive timing member is the first such fabric material to exhibit such low air permeability through the presence of a coating applied thereto, but which also is an unscoured and/or uncleaned fabric prior to application of such coating, but after construction thereof.

Another test which the specific coated timing member fabric must pass is the oven aging test. Such a test also simulates the storage of a fabric over a long period of time upon exposure at high temperatures and actually is used to analyze alterations of various different fabric properties after such a prolonged storage in a hot ventilated oven (>100° C.) for 2 or more weeks. For the purposes of this invention, this test was used basically to analyze the air permeability and tensile strengths of the coated timing member fabric after storage under a pressure of about 125 Pascals. Such coated timing member fabrics generally should exhibit an air permeability level of less than about 0.2 cfm at 125 Pa. Again, the lower the air permeability, the better the coating.

While the invention will be described and disclosed in connection with certain preferred embodiments and practices, it is in no way intended to limit the invention to those specific embodiments, rather it is intended to cover equivalent structures structural equivalents and all alternative embodiments and modifications as may be defined by the scope of the appended claims and equivalence thereto.

PREFERRED EMBODIMENTS OF THE INVENTION

In accordance with the potentially preferred practices of the present invention, a solvent-borne (e.g., toluene) microdispersion of finely divided elastomeric resin (such as selfcross-linking silicone, e.g., polyorganosiloxane particles) is compounded with a thickener and a flame retardant to yield a compounded mix having a viscosity of about 8000 centipoise or greater. The potentially preferred silicone dispersion is marketed under the trade designation 4-7224 Silicone Rubber from Dow Corning. Other preferred cross-linked elastomeric resins include polyurethane, such as WITCO-BOND™ 253 (35% solids), from Witco, and SANCURE®, from BFGoodrich, Cleveland, Ohio; hydrogenated NBR, such as CHEMISAT™ LCH-7335X (40% solids), from Goodyear Chemical, Akron, Ohio; EPDM, such as EP-603A rubber latex, from Lord Corporation, Erie, Pa.; butyl rubber, such as Butyl rubber latex BL-100, from Lord Corporation; acrylic rubber (elastomers), such as HYCAR™, from BFGoodrich; polyarmide dispersions, such as MICRO-MID® hpl, from Union Camp; thermoplastic polypropylene, such as P947M-026 from Huntsman Petrochemical; and possibly polyethylene terephthalate, such as RITEFLEX® from Ticona. A potentially preferred thickener is marketed under the trade designation NATROSOL™ 250 HHXR by the Aqualon division of Hercules Corporation which is believed to have a place of business at Wilmington, Del. The cross-linking agent may be any such compound which is well known in the art, such as melamine formaldehyde, and the like.

In order to meet Federal Motor Vehicle Safety Standard 302 flame retardant requirements for the automotive industry, a flame retardant is also preferably added to the compounded mix. One potentially preferred flame retardant is AMSPERSE® F/R 51 marketed by Amspec Chemical Corporation which is believed to have a place of business at Gloucester City N.J.

Once compounding is complete, the formulation is preferably scrape-coated across the fabric substrate and dried and cured to form a thin coating. Scrape coating in this sense includes, and is not limited to, knife coating, in particular knife-over-gap table, floating knife, and knife-over-foam pad methods, to name a few different method types. Such scrape coating permits most of the coating resin to remain within the interstices of the yarns of the airbag fabric. It is within these interstices that air is most likely to leak from an inflated airbag without any coating present. Furthermore, scrape coating permits very little resin to be applied to the raised yarn of the airbag fabric at this low coating weight. As a result, this particular distribution of coating materials on the surface of the airbag fabric allows the cross-linked elastomeric resin coating to seal the fabric while the low coating weight also simultaneously restricts contact between resin samples located on different portions of the fabric surface. This characteristic is very important to ensure the subject fabric will pass the required blocking test, described above.

The final dry weight of the coating is preferably about 2.0 ounces per square yard or less and most preferably 1.0 to about 1.5 ounces per square yard. The resultant base fabric is substantially impermeable to air when measured according to ASTM Test D737, "Air Permeability of Textile Fabrics," standards.

In order to further describe the present invention the following nonlimiting examples are set forth. The polyarnide elastomer discussed above and described in more detail below is the most preferred embodiment of the invention. These examples are provided for the sole purpose of illustrating some preferred embodiments of the invention and are not to be construed as limiting the scope of the invention in any manner.

EXAMPLE 1

A fabric was woven on a Dornier rapier loom which comprised, as warp yarns, two-ply and twisted unsized polyethylene terephthalate 840 denier T-787 yarns (from KoSa), and, as fill yarns, single-ply polyethylene terephthalate 1300 denier T-800 yarns (also from KoSa), in a plain weave pattern at 51 ends by 22 picks per inch of base fabric. The woven fabric exhibited an overall weight of about 17.5 ounces per square yard and a thickness (on average) of about 835 microns. The fabric was then, without scouring or cleaning of the fabric, coated with a solvent-based silicone coating comprising 30% of 4-7224 Silicone Rubber from Dow Corning at a final dry add-on coating weight of 1.5 ounces per square yard (on average) utilizing an 830 micron gap setting on the knife coater, which permitting complete filling of the yarn interstices and minimized excess covering of the warp ends (in order to reduce blocking). Talc was applied over the coating as an anti-blocking agent as a supplemental measure to prevent blocking due to cohesion between discrete coated fabric portions. After coating, the fabric was then cured at a temperature of about 170° C. Such a temperature also permitted controlled shrinkage of the coated fabric to a final construction of about 54 ends by 22 picks per inch with a resultant fabric weight of about 19.5 ounces per square yard.

This fabric was then sewn into an enclosed tube with specific discrete openings cut therein to correlate to specific openings present within an inflation module manifold. The fabric exhibited an air permeability of about 0.24 cfm through the interstices of the yarns upon application of air pressure of about 2,500 Pa (as well as an air permeability of about 0.02 cfm upon application of air pressure of about 125 Pa). Furthermore, the warp direction tensile strength measured 1,015 lb/in with an elongation of about 43.0% at break and the filling direction tensile strength measured 836 lb/in with an elongation of about 33% at break. The fabric also passed the aforementioned blocking test easily.

EXAMPLE 2

The same base fabric as in EXAMPLE 1 was produced but coated at a gap setting of about 950 microns (for thicker coating). The resultant coating add-on dry weight was about 2.0 ounces per square yard and, after curing at a temperature of about 170° C., the resultant total weight of the fabric was about 20.0 ounces per square yard. The resultant air permeability was measured to be 0.12 cfm at 2,500 Pa and the warp direction tensile strength measured 1,128 lb/in with an elongation of 44.3% at break. The resultant fill direction tensile strength measured 838 lb/inch with an elongation of 33.3% at break. The fabric also passed the aforementioned blocking test (although the time required for separation was a slower than for the fabric of EXAMPLE 1). Although such an alternative is potentially preferred, this example required a slower line speed to coat the target fabric and the amount applied was in excess of that needed to provide the low air permeability desired.

EXAMPLE 3

The same base fabric as in EXAMPLE 1 was produced but coated at a gap setting of about 730 microns (for thinner coating). The resultant coating add-on dry weight was about 1.4 ounces per square yard and, after curing at a temperature of about 170° C., the resultant total weight of the fabric was about 19.4 ounces per square yard. The resultant air permeability was measured to be 0.26 cfm at 2,500 Pa warp direction tensile strength measured 1,034 lb/in with an elongation of 45.3% at break. The resultant fill direction tensile strength measured 865 lb/inch with an elongation of 33.7% at break. Thus, even at such a low coating add-on weight, the interstices were completely filled so as to insure adequate control of air permeability and proper blocking measurements.

BRIEF DESCRIPTION OF THE DRAWINGS

The accompanying drawings, which are incorporated in and constitute a part of this specification, illustrate several potentially preferred embodiments of the invention and together with the description serve to explain the principles of the invention wherein:

FIG. 1 is a perspective view schematically illustrating the inventive inflation assembly as incorporated within a non-inflated airbag cushion.

FIGS. 2A–2D are cross-sectional views of the inflation assembly of FIG. 1 that schematically illustrate the flow of inflation gas through the timing member and into the airbag cushion upon activation of the propellant.

FIG. 3 schematically illustrates one application of the inflation assembly as a side curtain-type airbag inflator with reference to an interior side view of a vehicle.

FIG. 4 schematically illustrates the inflation assembly of FIG. 3 with reference to a front view of a vehicle.

DETAILED DESCRIPTION OF THE DRAWINGS

Reference will now be made in detail to potentially preferred embodiments of the invention, examples of which have been illustrated in the accompanying drawings. It is to be understood that it is in no way intended to limit the invention to such illustrated and described embodiments. On the contrary, it is intended to cover all alternatives, modifications and equivalents as may be included within the true spirit and scope of the invention as defined by the appended claims and equivalents thereto.

Turning now to the drawings, wherein like elements are denoted by like reference numerals throughout the various views, in FIG. 1 an inflator 20 is illustrated including an elongated propellant 28. Upon ignition, the propellant 28 combusts and generates inflation gasses (among other combustion products) which then inflate the airbag 24. The inflation gas exits through at least one opening 56 within an inflation manifold 52 which directs the flow of inflation gas toward the desired airbag 24. Prior to reaching that final destination, the inflation gas first enters and inflates the inventive timing member 96 (preferably constructed as in Example 1, above) which in turn directs the flow of inflation gas through at least one of its own preselected openings 100. The propellant 28 may be comprised of any well known composition, such as combustible nitrogen-based formulations (e.g., gun-type propellants comprising hexahydrotrinitrotriazine and/or cyclotrimethylene trinitramine and/or cyclotetramethylenethanitramine and/or pentaerythritol tetranitrate, and the like), including binding materials, such as hydroxymethylcellulose, and the like, and other standard propellant components (e.g., ammonium nitrate, strontium nitrate, colorants, polymeric thickeners, and the like).

The cross-sectional illustrations of FIGS. 2A–2D exhibit one preferred example of utilization of the inventive inflation assembly of FIG. 1 (and more specifically the inventive fabric timing member 52) upon ignition of the propellant 28. In its deactivated state (FIG. 2A), the propellant 28 has not yet been activated and no inflation gasses have been generated. In FIG. 2B, a collision event has occurred that has caused the initiator assembly 32 to ignite the propellant 28, which in turn generated combustion products, including inflation gas which exited the openings 56 within the manifold 52, without rupturing or damaging the manifold 52 itself. The inflation gasses then enter the chamber 102 of the timing member 96 and move radially outward from the outer layer 60 of the manifold 52 through the chamber 102 toward the wall of the timing member 96 and ultimately enter the airbag 24. In FIG. 2C, there is shown a substantially uniform entry of inflation gasses about the cross-section of the airbag 24, as well as a substantially uniform entry of inflation gases along the entire length of the airbag 24. Such uniform inflation and filling is provided by means of the predetermined spacing and sizing of the metering openings 100 within the timing member 96. As seen in FIG. 2D, the airbag 24 uniformly receives inflation gases and is uniformly filled or pressurized throughout its volume by means of the timing member 96 by the means noted above. In accordance with this uniform filling, inflation gases directly from the inflator 20 are filling the entire airbag 24 rather than inflation gases entering the airbag 24 at a limited area such that, in order to complete filling of the airbag 24, inflation gases in the airbag 24 itself are required to move longitudinally within the airbag 24 in order to achieve the desired force or pressure. Such non-uniform filling can result in the vehicle occupant being subjected to a less than desirable force due to the inflatable filling nonuniformly. With reference to FIGS. 3 and 4, one application of the inflator assembly 20 is schematically illustrated. In such an application, the inflator assembly 20 is used with an airbag 24 that is located above one or more vehicle side windows. Such an inflator assembly 20 is commonly termed a side curtain inflator. Such an inflator assembly 20 is particularly characterized by having a substantially greater length, particularly in comparison with driver, passenger, and side impact inflators. As seen in FIGS. 3 and 4, a curtain inflator assembly 20 is substantially elongated and has a length that is at least one-half the length of the airbag 24 and preferably is substantially equal to the length of the inflator assembly 20. Consequently, when the inflator assembly 20 is activated to deploy or inflate the airbag 24 of the curtain inflator module 110, there is a substantially uniform filling of the airbag 24 along its length. The generation and entry of inflation gases to the airbag 24 depend on propagation rate associated with the combustion wave. That is to say, the filling of the airbag 24 along its entire length at substantially the same time is limited by, or dependent upon, the rate at which the elongated propellant 28 is ignited beginning at its end adjacent to the initiator assembly 32 and continuing to its opposite end.

There are, of course, many alternative embodiments and modifications of the present invention which are intended to be included within the spirit and scope of the following claims.

What is claimed is:

1. An inflation assembly timing member comprising discrete openings in relation to preselected locations for introduction of inflation gas within a target airbag;

wherein said timing member comprises a fabric comprising warp yarns having a denier between 630 and 2000 and fill yarns having a denier between 630 and 1400;

wherein a coating has been applied to at least a portion of said fabric; and wherein said fabric exhibits (a) an average overall tensile strength of at least 900 psi in the warp direction and an average overall tensile strength of at least 700 psi in the fill direction, both up to a temperature of at least 80° C., (b) a permeability to air of at most 0.3 cfm at 2,500 Pa, and (c) no appreciable blocking upon inflation upon storage in an environment heated to about 100° C. for 7 days.

2. The inflation assembly of claim 1 wherein said fibers within said fabric are selected from the group consisting of polyester, polyarnide, polyaramid, and any combinations thereof.

3. The inflation assembly of claim 2 wherein said warp direction yarn is a multi-ply yarn having an elongation at break of at least 43%.

4. The inflation assembly of claim 3 wherein said fill direction yarn is at least a single-ply yarn having an elongation at break of at most 35%.

* * * * *